United States Patent [19]

Takehana

[11] Patent Number: 5,229,806
[45] Date of Patent: Jul. 20, 1993

[54] MULTI-POINT RANGE FINDING DEVICE

[75] Inventor: Takamichi Takehana, Suwa, Japan

[73] Assignee: Chinon Kabushiki Kaisha, Suwa, Japan

[21] Appl. No.: 861,595

[22] Filed: Apr. 1, 1992

[30] Foreign Application Priority Data

May 28, 1991 [JP] Japan .................. 3-123845

[51] Int. Cl.$^5$ .............................................. G03B 13/36
[52] U.S. Cl. ........................................ 354/403; 356/1
[58] Field of Search ............................. 354/403; 356/1

[56] References Cited

U.S. PATENT DOCUMENTS

| 4,542,971 | 9/1985 | Numata | 354/403 |
| 4,601,574 | 7/1986 | Yamane et al. | 354/403 |
| 4,764,786 | 8/1988 | Tamura et al. | 354/403 |
| 4,849,781 | 7/1989 | Nakazawa et al. | 354/403 |
| 4,938,588 | 7/1990 | Taniguchi | 354/403 |
| 5,051,766 | 9/1991 | Nonaka et al. | |

FOREIGN PATENT DOCUMENTS

| 2272526 | 11/1990 | European Pat. Off. . |
| 60-60511 | 4/1985 | Japan . |
| 61-155801 | 7/1986 | Japan . |
| 63-167213 | 7/1988 | Japan . |
| 63-302313 | 12/1988 | Japan . |
| 1-262410 | 10/1989 | Japan . |
| 2-240508 | 12/1990 | Japan . |

Primary Examiner—Russell E. Adams
Attorney, Agent, or Firm—Cushman, Darby & Cushman

[57] ABSTRACT

In the multi point range finding device according to this invention, the photosensitive means 11 for detecting the light reflected from the subject (3) incudes the PSDs (20a) to (20c) which are disposed at positions and intervals corresponding to plural light-irradiating sources (4a to 4c), and the semiconductor resistance elements (21a to 21c), each of the PSDs (20a to 20c) and each of the semiconductor resistance elements (21a to 21c) are connected in series to each other, and a set of the PSDs (20a to 20c) as well as a set of the semiconductor resistance elements 21a to 21c are connected in parallel with one another. The photoelectric currents generated in the PSDs (20a to 20c) are outputted through common output electrodes E1 and E2. With this structure, a compact multipoint range finding device having high precision can be produced in low cost.

5 Claims, 8 Drawing Sheets

MULTI-POINT RANGE FINDING DEVICE

BACKGROUND OF THE INVENTION

1. Field of the Invention

This invention relates to an active type range finding device for performing a multipoint range finding operation, which is used in an automatic focus adjusting device for a cameral, etc., and particularly to an active type range finding device using a semiconductor position-sensitive detector (hereinafter referred to as "PSD").

2. Related Background Art

As one type of multipoint range finding devices has been proposed a longitudinal type multipoint range finding device as disclosed in U.S. Pat. No. 4,740,806. This type of multipoint range finding device mainly includes plural light-irradiating sources which are arranged in a direction perpendicular to a line (hereinafter referred to as "base line") connecting both centers of a light-irradiating lens and a light-receiving lens. Through the applicant's study of the above type of multipoint range finding device, the applicant has actually developed, produced and sold a camera having a built-in type of multipoint range finding device.

On the other hand, as another type of range finding device has been known a lateral type range finding device. FIG. 1 is a schematic diagram showing the operation and principle of a triangulate range finding device serving as the lateral type of range finding device. The lateral type range finding device mainly includes a light-irradiating source 4 and a PSD 20 which are disposed in a base-line direction D. Upon irradiation of a range-finding light from the light-irradiating source 4 through a light-irradiating lens 1 to a subject 3, the range-finding light is reflected from the subject 3, and irradiated through a light-receiving lens 2 onto the PSD 20. In response to the incidence of the reflected range-finding light, the PSD 20 outputs currents $I_1$ and $I_2$ containing information on an incident position of the light to a distance calculating circuit (not shown). The distance calculating circuit calculates a distance d to the subject 3 on the basis of the current values $I_1$ and $I_2$.

FIGS. 2 and 3 show examples of conventional lateral type multipoint range finding devices, respectively.

The lateral type multipoint range finding device as shown in FIG. 2 is disclosed in Japanese Laid-open Patent Application No. Sho-60-60511, and includes plural light-irradiating sources 4a to 4c for irradiating range-finding infrared-ray beams to the subject, a light-irradiating lens 1 provided on the optical axis of the light-irradiating sources 4a to 4c, a light-receiving lens 2 which is disposed away from the optical axis of the light-irradiating sources at a constant interval on the base line and has an optical axis in parallel to the optical axis of the light irradiation side, a position-sensitive detector (PSD) 20 having a photosensitive surface disposed in a direction perpendicular to the optical axis of the light-receiving lens 2, an infrared-ray light-irradiating source driving circuit 13 for driving the light-irradiating sources 4a to 4c to successively emit the infrared-ray beams therefrom, and a distance calculating circuit 14 for detecting a distance d to the subject on the basis of a distance signal corresponding to each light beam emitted from the light sources 4a to 4c.

Upon successive light-emission of the respective light-irradiating sources 4a to 4c by the light-irradiating source driving circuit 13, the light beam emitted from each of the light-irradiating sources 4a to 4c is focused on the subject 3 by the light-irradiating lens 1, and reflected from the subject 3. The light beam reflected from the subject 3 is converged by the light-receiving lens 2, and irradiated onto the PSD 20. Thereafter, an incident position of the light beam emitted from each light-irradiating source to the PSD 20 is calculated on the basis of an output current of the PSD 20 which is generated in accordance with the incidence of the light beam, and the distance d to the subject 3 is finally obtained.

FIG. 3 is a schematic diagram showing the operation principle of a lateral type multipoint range finding device having intermediate electrodes as disclosed in Japanese Laid-Open Patent Application No. Hei-1-262410. This lateral type multipoint range finding device has the similar construction as the multipoint range finding device as shown in FIG. 2, that is, includes a light-irradiating sources 4a to 4c, a light-irradiating lens 1, a light-receiving lens 2, a PSD 20, an infrared-ray light-irradiating source driving circuit (not shown) and a distance calculating circuit. The difference between FIG. 2 and FIG. 3 is that the PSD 20 of this type is newly provided with plural intermediate electrodes 7-1, 7-2 and 7-3 between a pair of electrodes at both ends of the PSD 20. The operating principle of this type of lateral multipoint range finding device is as follows. The light-irradiating sources 4a to 4c are driven by the light-irradiating source driving circuit so as to successively emit the light beams therefrom, the light beams reflected from the subject 3 are successively irradiated onto the PSD 20 to obtain an output current serving as a position-sensitive signal, and then the distance to the subject 3 is calculated on the output current value. A series of the above processes are identical to those for the lateral type multipoint range finding device as shown in FIG. 2. However, the operation of the light-receiving part is different between the devices as shown in FIGS. 2 and 3 because the construction of the PSD serving as a photosensitive portion is different therebetween. When the light beam reflected from the subject 3 is irradiated onto the PSD 20, any two electrodes through which photocurrents $I_1$ and $I_2$ are taken out, for example, the intermediate electrodes 7-1 and 7-2 can be freely selected in accordance with a region of the PSD to be irradiated with the light beam. In this case, the selection of the intermediate electrodes may be conducted by an electrode switching control means (not shown).

Referring to the lateral type multipoint range finding device as shown in FIG. 2 again, this device includes plural light-irradiating sources, and thus a range-finding angle is wider. In association with the widening of the range-finding angle, the distance 2L between both terminal electrodes of the photosensitive portion of the PSD is also longer. As the distance 2L between the both terminal electrodes of the PSD is longer, the range-finding precision is lowered. That is, the relationship among the distance 2L between both terminal electrodes of the PSD, a variation $\Delta L$ of the light-incident position onto the PSD 20 and the output currents $I_1$ and $I_2$ is represented by the following equation.

$$\Delta(I_2-I_1)/(I_1+I_2)=\Delta L/L.$$

As is apparent from the above equation, as the distance 2L between both terminal electrodes of the PSD is longer, the variation $\Delta(I_2-I_1)/(I_1+I_2)$ of a distance detection signal to the variation $\Delta L$ of the light-incident position is smaller, and thus the range-finding precision is lowered. In addition, the light-incident position corresponding to the distance to the subject is varied every time the light-irradiating source is switched to another, so that a distance correction means is newly required.

On the other hand, in the lateral type multipoint range finding device as shown in FIG. 3, even if the detection range of the photosensitive portion is widened, the distance between both terminal electrodes is not lengthened because the intermediate electrodes are provided to the PSD and any two of them can be freely selected. Therefore, the variation $\Delta(I_2-I_1)/(I_1+I_2)$ of the distance detection signal is not reduced, and thus the range-finding precision is not lowered. In addition, the intermediate electrodes may be disposed in accordance with an interval of light-incident positions so that no distance correction means is required. However, the provision of the intermediate electrodes to the PSD causes increment of a number of output terminals of the PSD, and in addition a PSD electrode switching control means and a PSD electrode selecting means are newly required. These have obstructed miniaturization of the device.

Further, in order to simplify the distance calculation for both of the PSDs used in the conventional range-finding devices as shown in FIGS. 2 and 3, an incident position of a range-finding light when the subject would be located at an infinite-point is required to be set to a just intermediate position between the two electrodes of the PSD. In this case, a half photosensitive region of the PSD (a left half region in FIGS. 1 and 2) becomes an ineffective or insensitive region where no range-finding light is detected. This is also an obstacle to the miniaturization of the device.

SUMMARY OF THE INVENTION

An object of this invention is to provide a multipoint range finding device having a miniaturized structure and a high detection precision, in which a detection signal is easily read out and is easily subjected to a post-processing.

In order to attain the above object, the multipoint range finding device according to this invention includes position sensitive detectors (PSDs) whose number is equal to the number of range finding light-irradiating sources, and which are provided to a photosensitive portion, and a dummy resistance connected in series to each of the PSDs. The dummy resistance has the same function as an ineffective photosensitive region, and thus the ineffective photosensitive region can be eliminated from the PSD, so that the whole photosensitive surface is set to an effective photosensitive region to obtain output currents for a simple distance calculation.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

Preferred embodiments according to this invention will be described hereunder with reference to the accompanying drawings.

Figure 1:
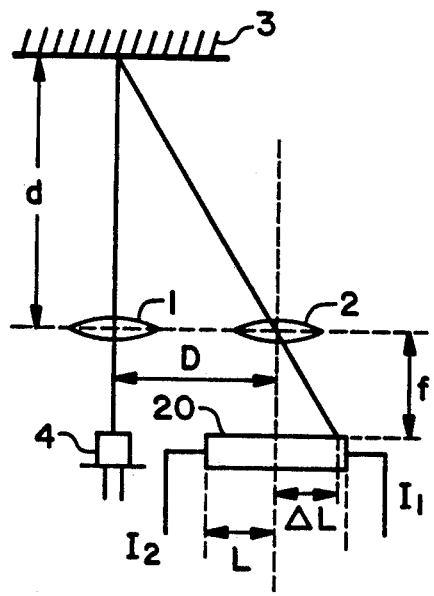
FIG. 1 is a schematic diagram showing the range finding principle of a range finding device.
Figure 2:
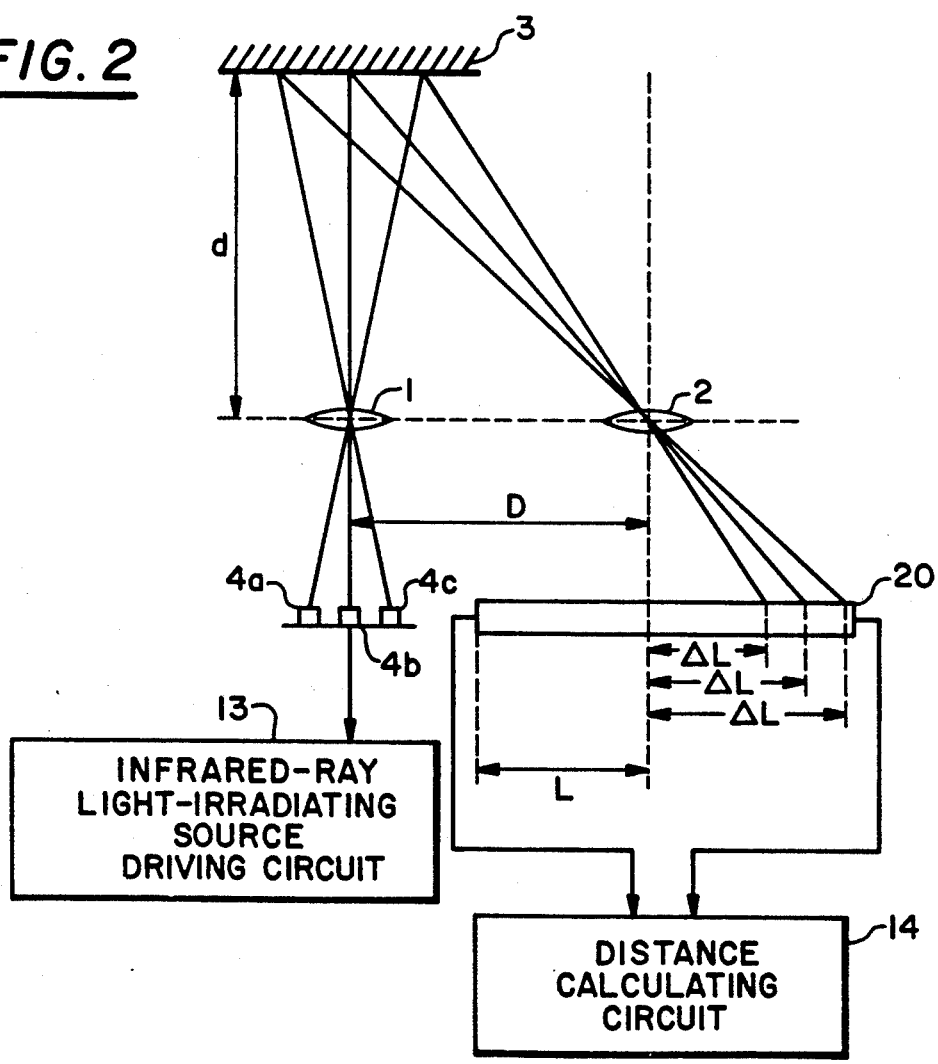
FIGS. 2 and 3 are schematic diagrams showing conventional lateral type multipoint range finding devices.
Figure 3:
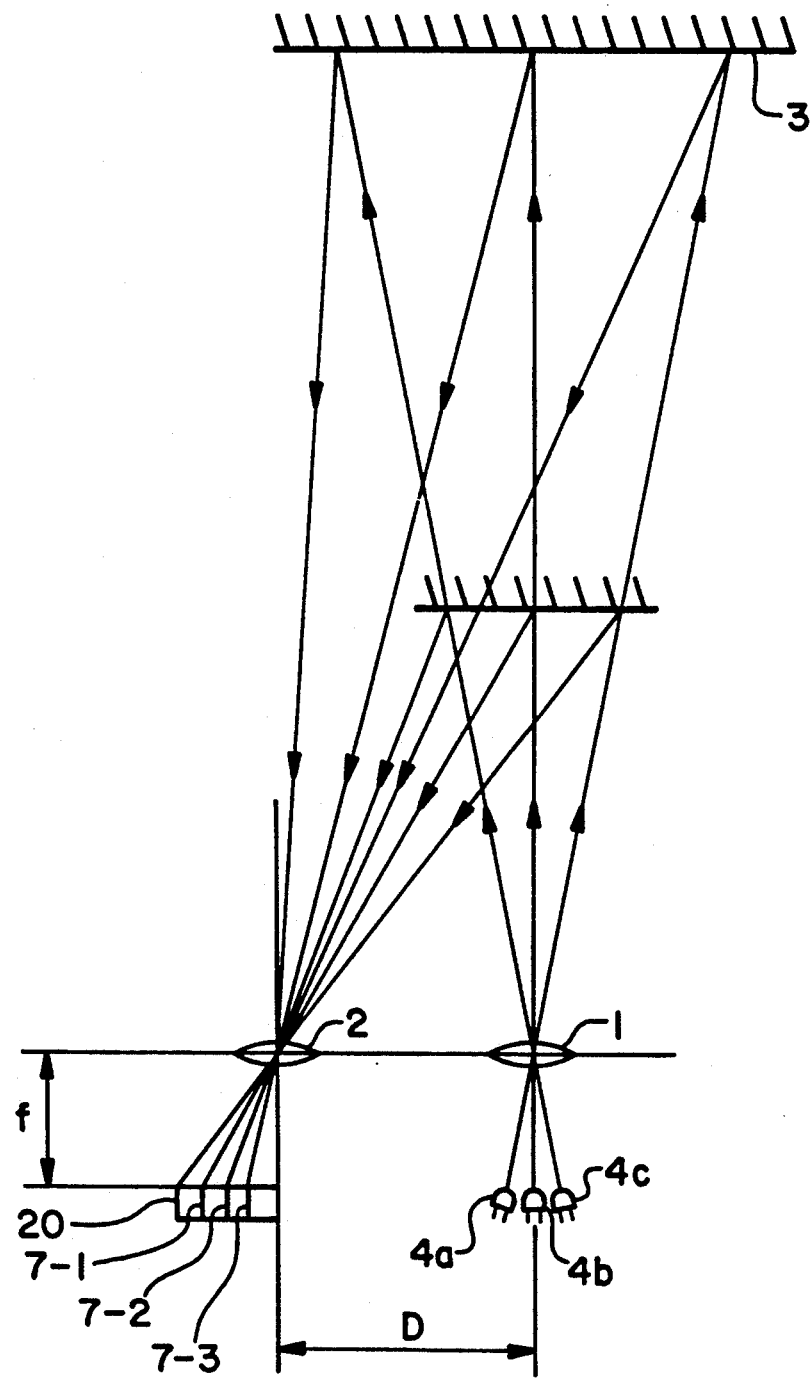
Figure 4:
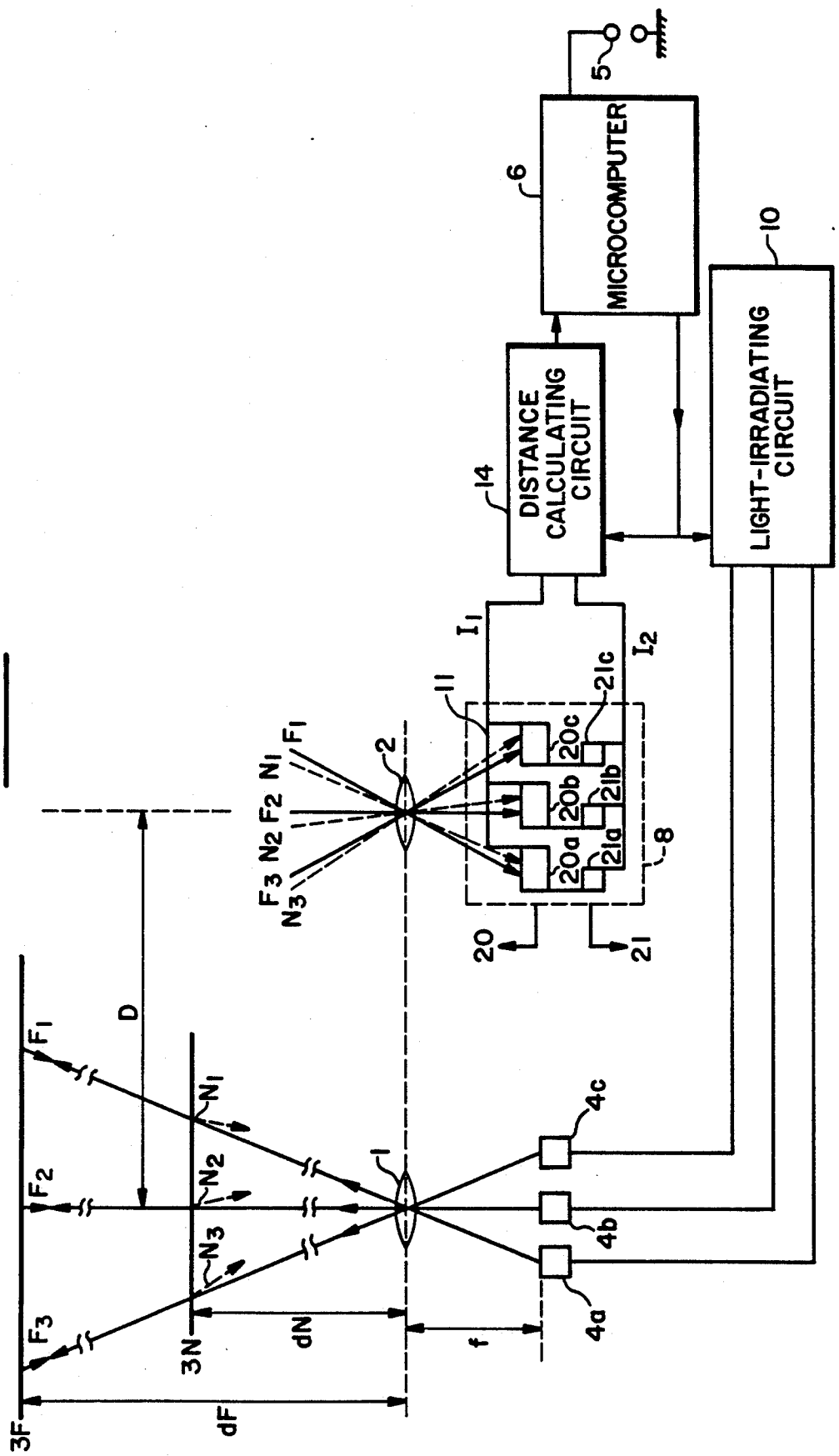
FIG. 4 is a schematic diagram showing an embodiment of this invention.

The multipoint range finding device as shown in FIG. 4 includes a start switch 5, a light-irradiation circuit 10, a distance calculating circuit 14, a microcomputer 6 for controlling the light-irradiation circuit 10 and the distance calculating circuit 14, plural light-irradiating sources 4a to 4c for irradiating a range-finding light to a subject, photosensitive means 11 having three PSDs which serve to receive the light reflected from the subject 3 and are disposed in the direction of a base line D, a light-irradiating lens 1 and a light-receiving lens 2. Reference numerals $3_N$ and $3_F$ represent a NEAR-position subject and a FAR-position subject, respectively.

Figure 5:
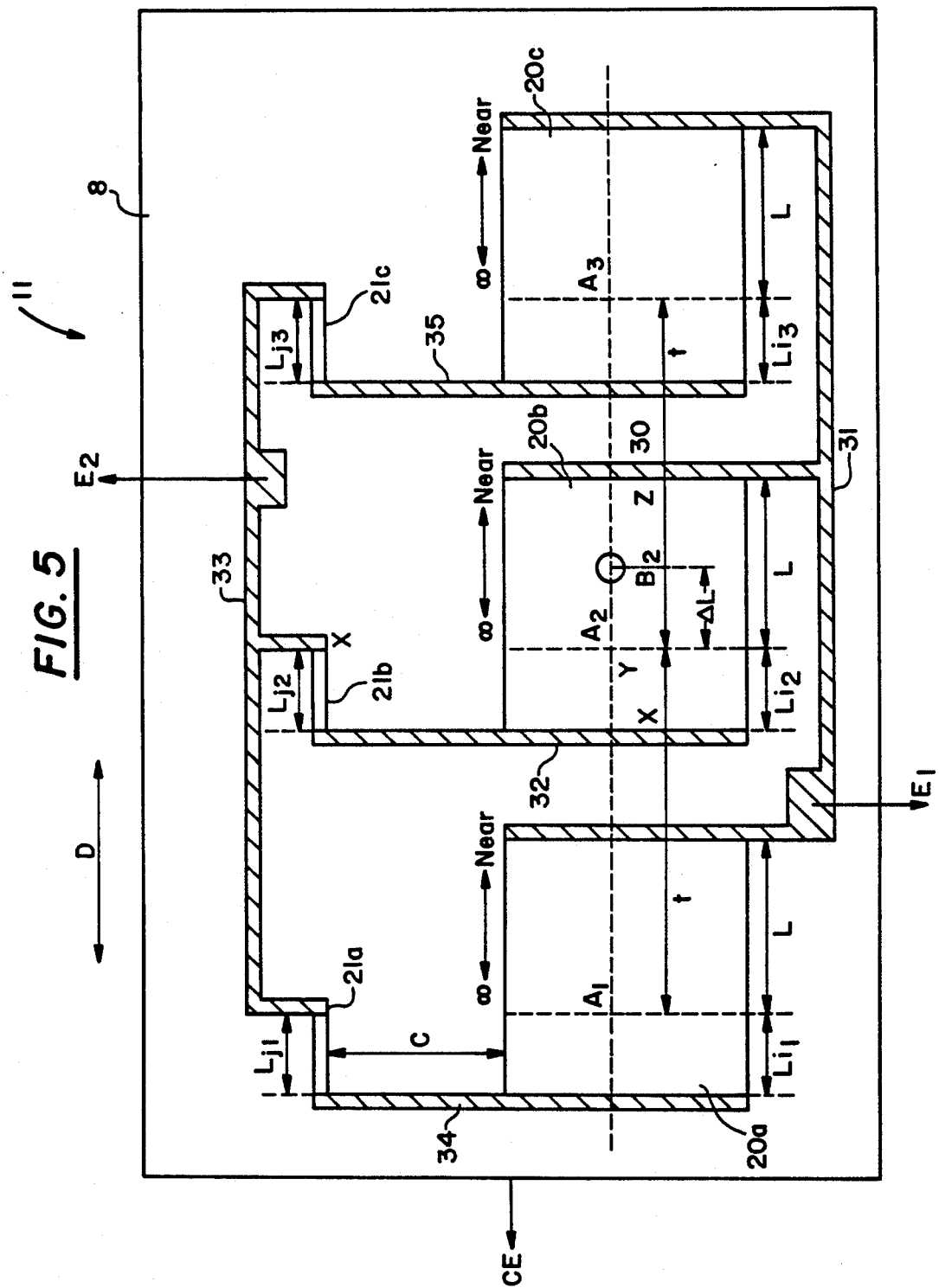
FIG. 5 is an enlarged plan view showing photosensitive means 11 of the embodiment of this invention.

As shown in FIG. 5, the photosensitive means 11 includes three (first to third) PSDs 20a to 20c on a PSD substrate 8, which are disposed along the base line direction D and spaced from one another at an interval of t corresponding to the interval of the light-irradiating sources 4a to 4c. On the PSD substrate 8 are also formed semiconductor resistance elements 21a to 21c which are connected in series to the PSDs 20a to 20c, respectively. Each of the semiconductor resistance elements 21a to 21c is formed of a resistance layer of a PSD. Each semiconductor resistance element has photoconductivity, that is, has capability of obtaining a photoelectric current in response to incident light thereto, however, is used merely as a resistance in this embodiment. Further, the semiconductor resistance elements 21a to 21c have the same resistance value per unit length as the PSDs 20a to 20c, respectively. In addition, the semiconductor resistance elements 21a to 21c are spaced from one another at a distance C so that they are prevented from being affected by a cross-talk of incident lights to the first PSD 20a to third PSD 20c. Both one ends of the resistance element 21a and the first PSD 20a are connected in series to each other through an aluminum wiring 34 (hatched portion) serving as a conductive wire to form a first series circuit. Likewise, both one ends of the resistance element 21b and the second PSD 20a are connected in series to each other through an aluminum wiring 32 (hatched portion) to form a second series circuit, and both one ends of the resistance element 21c and the third PSD 20c are connected in series to each other through an aluminum wiring 35 (hatched portion) to form a third series circuit. The first series circuit comprising the PSD 20a and the resistance element 21a, the second series circuit comprising the PSD 20b and the resistance element 21b and the third series circuit comprising the PSD 20c and the resistance element 21c are connected in parallel to one another through aluminum wirings 31 and 33. Electrodes $E_1$ and $E_2$ are drawn out of the aluminum wirings 31 and 33, and serve as output electrodes a common electrode CE is drawn out of a back surface of the PSD substrate 8.

Figure 6:
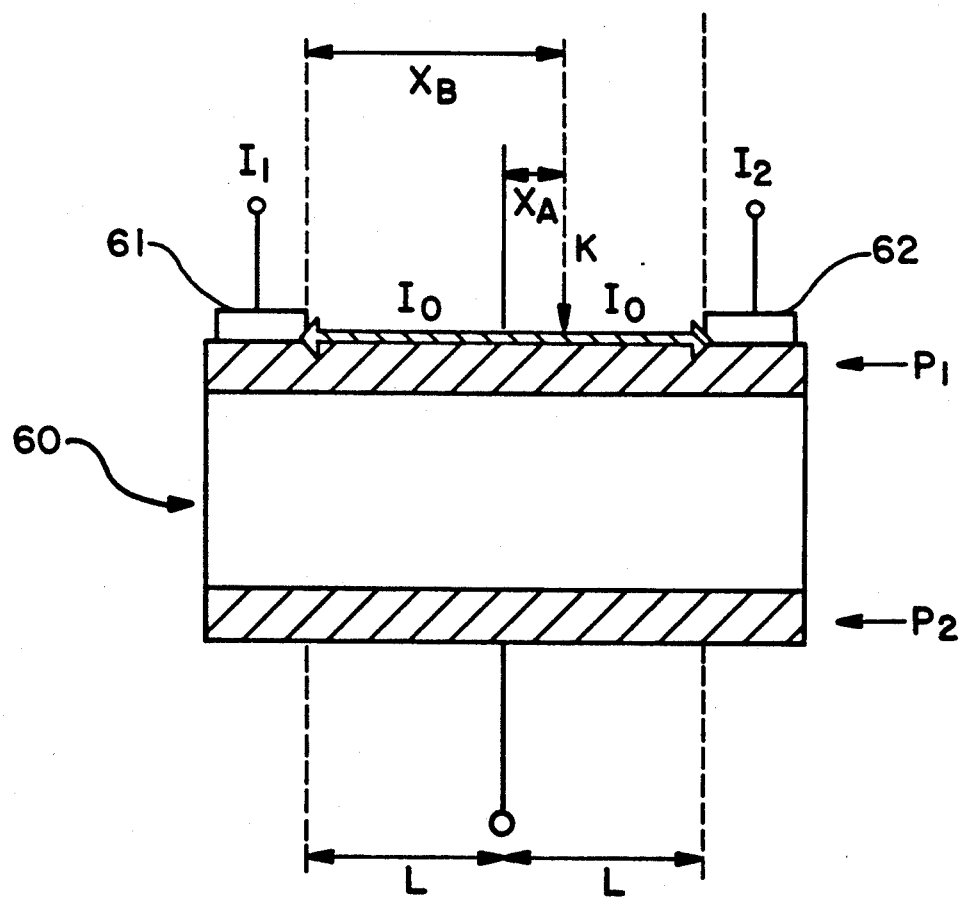
FIG. 6 is a sectional view showing a general operation principle of a PSD.

The principle of operation of the PSD will be briefly described with reference to FIG. 6. FIG. 6 is a sectional view of the general construction of the PSD. Upon incidence of a reflected light K from the subject onto the surface of a PSD 60, charges proportional to light energy of the reflected light K are generated in the PSD 60. The generated charges are passed as a photoelectric current $I_0$ through a resistance layer $P_1$, and outputted from electrodes 61 and 62 at both ends of the resistance layer $P_1$. Since the resistance layer has an uniform resistance value over a space between the electrodes 61 and 62, the photoelectric current $I_0$ is divided into two current flows in opposite directions in inverse proportion to a distance to the each electrodes, and taken out as output currents $I_1$ and $I_2$. The output currents are represented by the following equations.

output $I_1 = I_0(L - X_A)/2L$ output $I_2 = I_0(L + X_A)/2L$.

Thereafter, a value $X_A$ indicating a light-incident position is calculated on the basis of the output currents $I_1$ and $I_2$. As described above, the light incident position is obtained on the basis of the operation principle of the PSD, and the distance to the subject can be calculated from the obtained light incident position.

FIG. 5 shows a case where the range finding light is emitted from the light-irradiating source 4b to the subject, and the range finding light reflected from the subject is incident to the position $B_2$ of the second PSD 20b. The PSD substrate 8 is beforehand positioned so that the range finding light which is emitted from the light-irradiating source 4b and reflected from the subject is incident to the position $A_2$ when the subject is disposed at an infinite point. That is, representing a distance between the point $A_2$ and a wiring 30 serving as one of terminal electrodes, a distance between the point $A_2$ and a wiring 32 serving the other terminal electrode and a distance between both electrodes of the resistance element 21b by L, $L_{i2}$ and $L_{j2}$ respectively, the point $A_2$ is set to such a position that the following equation is satisfied.

$L = L_{i2} + L_{j2}$.

Therefore, a resistance value between the point $A_2$ and the electrode 30 is equal to that between the point $A_2$ and the electrode 33, so that when the range finding light is incident to the position $A_2$, photoelectric currents outputted from the electrodes $E_1$ and $E_2$ are equal to each other. As described above, since the PSD is beforehand designed such that the difference of the photoelectric currents of the electrodes $E_1$ and $E_2$ for the subject at the infinite point is set to be zero, the difference between the photoelectric currents is increased at all times as the subject approaches to the multipoint range finding device. This simplifies the calculation of the distance to the subject.

Next, the general operation of this embodiment will be explained below.

Firstly, when a start switch is turned on, a microcomputer 6 issues a light-irradiating instruction to the light-irradiating circuit 10. Under the control of the microcomputer 6, the light-irradiating circuit energizes the light-irradiating sources 4a to 4c sequentially. The lights irradiated from these light-irradiating sources passes the light-irradiating lens 1 to be projected on the subject $3_N$ which is positioned near. The range-finding lights which are lights reflected from the subject $3_N$ are received by the light receiving means 11, through a light receiving lens 2. In the light receiving means 11, the range-finding light $N_1$ is incident to the first PDS 20a and the range-finding lights $N_2$ and $N_3$ are respectively incident to the second and third PDSs 20b and 20c. Each range finding light are time-separately incident to the PDSs and therefore output currents $I_1$ and $I_2$ corresponding to the PDSs can be respectively taken from electrodes $E_1$ and $E_2$.

The distance calculating circuit 14 obtains incident positions on the PSDs on the basis of the output currents $I_1$ and $I_2$ every PDS and calculates the distances $d_N$ to the subject $3_N$ every the range-finding light, using the incident position data.

Representing a distance between the light-incident position A when an object is positioned in an infinite point and an actual light-incident position, by $\Delta L$, a distance $d_N$ to the subject is represented by the following equation:

$d_N = D \cdot f / \Delta L$.

Here, D represents the length (base-line length) between the lens 1 and lens 2, and f represents a focal distance of the lens 1 and the lens 2.

When lights emitted from the light-irradiating sources 4a to 4c are irradiated to a far subject $3_F$, the lights reflected from the subject are detected as range finding lights $F_1$ to $F_3$ by the photosensitive means 11, and a distance $d_F$ to the subject is calculated in the same manner as described above.

Figure 7:
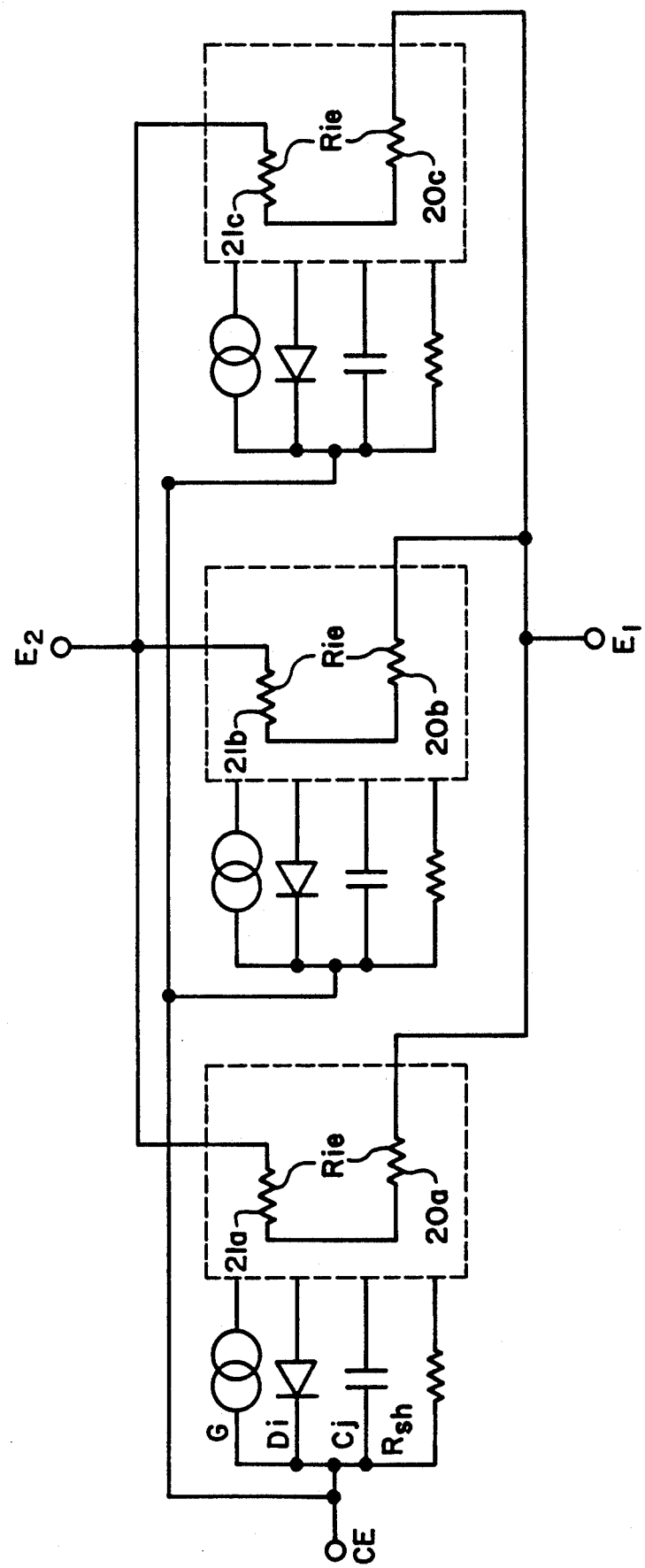
FIG. 7 is an equivalent circuit diagram of the photosensitive means 11 of the embodiment of this invention.

FIG. 7 is an equivalent circuit diagram of the photosensitive means used in this embodiment.

In FIG. 7, $R_{ie}$ represents a surface resistance; $R_{sh}$, a parallel resistance; $C_j$, a junction capacitance; $D_i$, an ideal diode; and G, a current source.

In this embodiment, a range finding of a subject at about 80 cm to an infinite point can be performed using Light-irradiating and light-receiving systems having D=30 mm, f=12 mm and t=1.4 mm, PSD interelectrode distance of $L_i$=0.25 mm and $L_j$=0.4 mm (that is, L=0.65 mm and 2L=1.3 mm), light-irradiating source emitting light beam of 0.4 mm$\phi$ and a PSD received image light of 0.4 mm$\phi$.

Figure 8A:
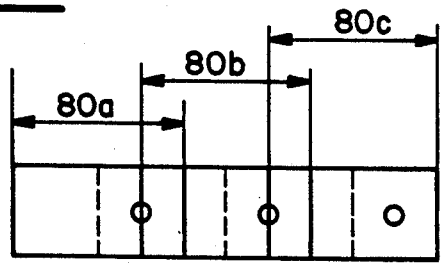
FIGS. 8A and 8B are plan views showing an effect of the embodiment of this invention.
Figure 8B:
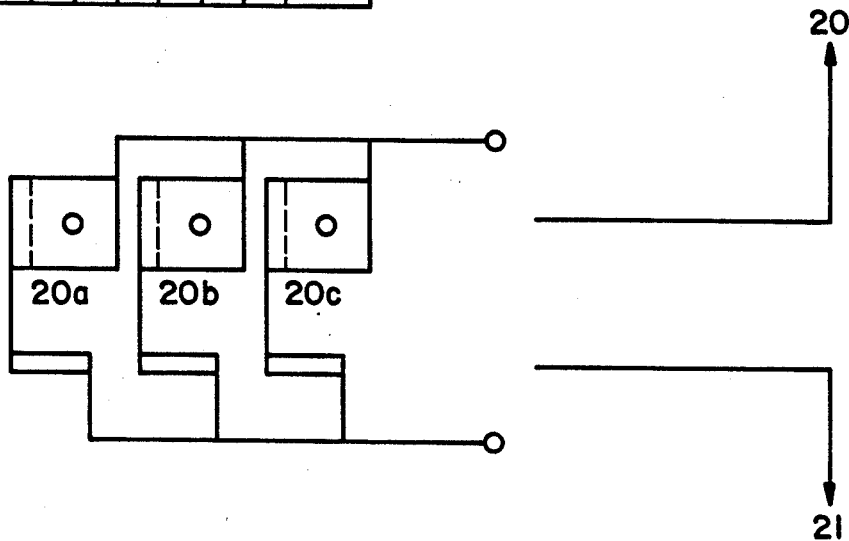

In order to promote the miniaturization of this type of range finding device, it is required to narrow the interval between the respective light sources and thus the interval between the respective PSDs which correspond to the light-irradiating sources. For example, even in a case where the light-irradiating sources are disposed such that, three PSDs 80a to 80c are overlapped with one another if a general type of conventional PSD is used as shown in FIG. 8A, according to the photosensitive means of this embodiment, the respective PSDs 20a to 20c can be disposed so as to be isolated from one another as shown in FIG. 8B.

Figure 9A:
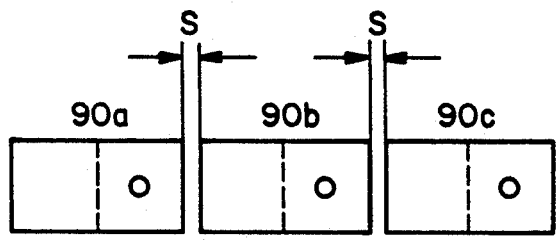
FIGS. 9A and 9B are plan views showing the effect of the embodiment of this invention.
Figure 9B:
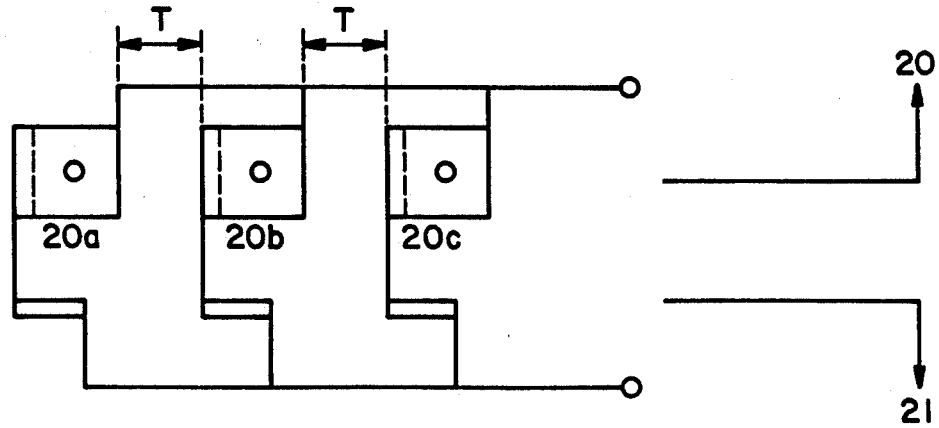

Likewise, even in a case where the three PSDs 90a to 90c are not overlapped with one another, but disposed adjacently to one another at an interval of S to the extent that they suffer the cross-talk affection as shown in FIG. 9A, the respective PSDs can be disposed isolatedly from one another at a sufficient distance T. FIG. 10 shows various modifications of the photosensitive means according to this invention.

Figure 10A:
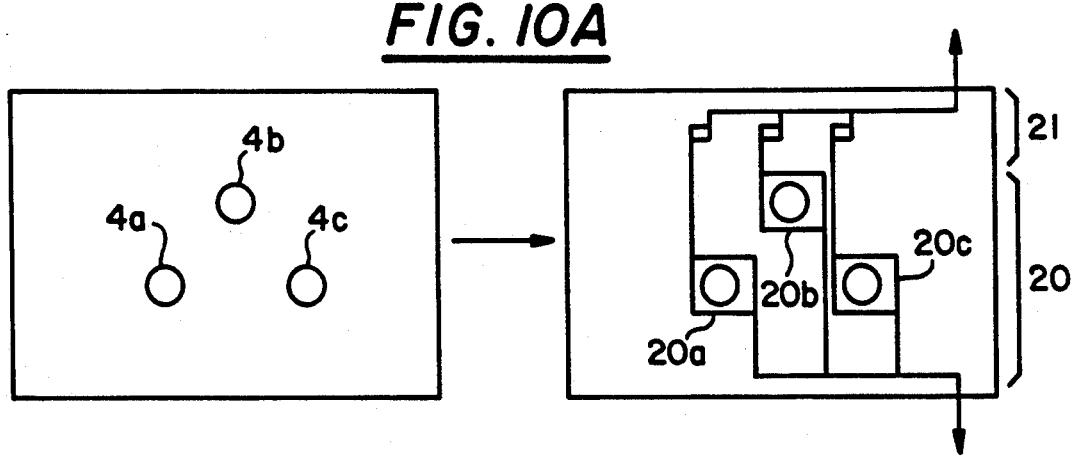
FIGS. 10A, 10B and 10C are plan views showing arrangements of a light-irradiating source and PSDs of another embodiments of this invention.
Figure 10B:
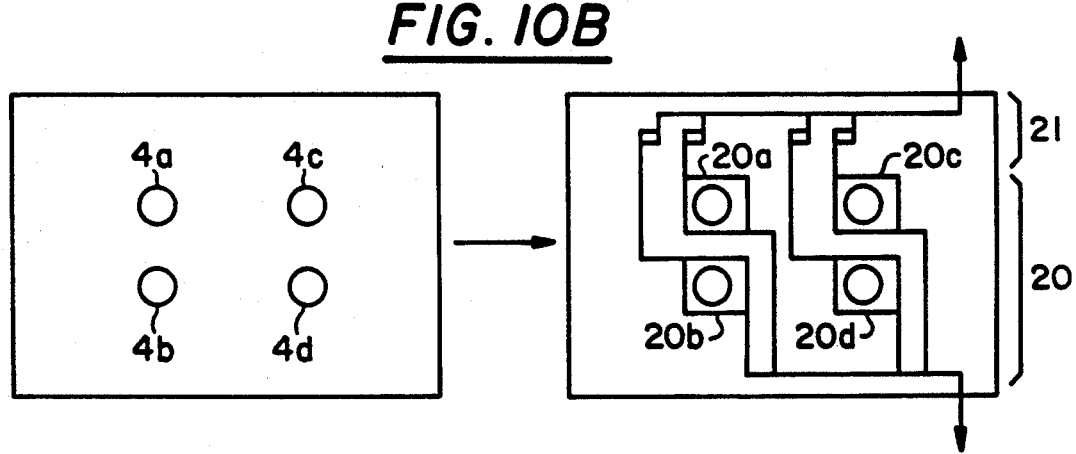
Figure 10C:
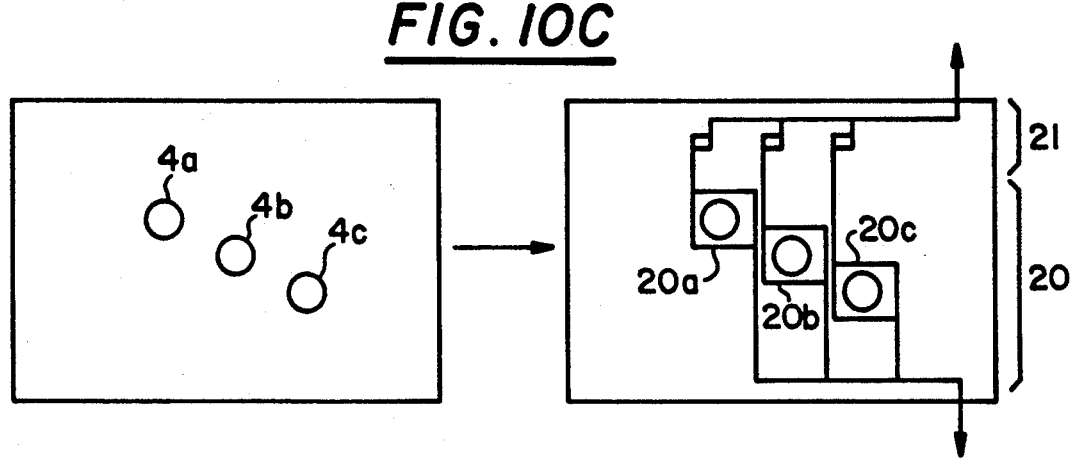

In the embodiment as described above, each set of the light sources and the photosensitive PSDs are aligned with one another along the base-line direction. However, these elements are not limited to the above arrangement. For example, the various modifications of the arrangement as shown in FIGS. 10A and 10C may be made insofar as the light-irradiating sources 4a to 4c and the PSDs 20a to 20c are positionally corresponding to one another. Further as shown in FIG. 10B, the light-irrating sources 4a to 4d and PDSs 20a to 20d may be also positionally corresponding to one another.

In the multi point range finding device according to this invention, the photosensitive means 11 for detecting the light reflected from the subject (3) incudes the PSDs (20a) to (20c) which are disposed at positions and intervals corresponding to plural light-irradiating sources (4a to 4c), and the semiconductor resistance elements (21a to 21c), each of the PSDs (20a to 20c) and each of the semiconductor resistance elements (21a to 21c) are connected in series to each other, and a set of the PSDs (20a to 20c) as well as a set of the semiconductor resistance elements 21a to 21c are connected in parallel with one another. The photoelectric currents generated in the PSDs (20a to 20c) are outputted through common output electrodes $E_1$ and $E_2$. With this structure, a compact multipoint range finding device having high precision can be produced in low cost.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A multipoint range finding device comprising a light irradiating unit for irradiating plural range finding lights to a subject, a light receiving unit for detecting a light-incident position of each of the range finding lights reflected from the subject, and a calculating unit for calculating a distance to the subject on the basis of the light-incident position,
   wherein said light receiving unit includes plural semiconductor position-sensitive detectors whose number corresponds to the number of the range finding lights, each of said semiconductor position-sensitive detectors having a photosensitive region for photoelectrically converting an incident light thereto to an electrical signal and two output electrodes provided so as to sandwich said photosensitive region therebetween, to thereby output through said output electrodes photoelectric currents whose current ratio relates to the incident position, and one output electrodes of said semiconductor, position-sensitive detectors being commonly connected to one another and the other output electrodes being commonly connected through dummy resistances to one another.

2. The multipoint range finding device as claimed in claim 1, wherein said light irradiating unit includes plural light-irradiating sources for emitting the range finding lights, a light-irradiating lens for irradiating the range finding lights from said light-irradiating sources to the subject as light beams at an angle, and said light receiving unit further includes a light-receiving lens for focusing each of the range finding lights emitted from said light irradiating unit and reflected from the subject onto the corresponding one of said semiconductor position-sensitive detectors.

3. The multipoint range finding device as claimed in claim 2, wherein each of said dummy resistances connected to said semiconductor position-sensitive detectors of said light receiving unit comprises a semiconductor resistance.

4. The multipoint range finding device as claimed in claim 3, wherein said semiconductor resistance is formed of a resistance layer of a semiconductor position-sensitive detector.

5. The multipoint range finding device as claimed in claim 4, wherein said semiconductor position-sensitive detectors for detecting the range finding lights and said semiconductor resistances are formed on the same substrate at such a interval that an electrical cross-talk is negligible.

* * * * *